United States Patent
Nakajima et al.

(10) Patent No.: US 9,513,747 B2
(45) Date of Patent: *Dec. 6, 2016

(54) TRANSPARENT CONDUCTIVE FILM AND TOUCH PANEL

(75) Inventors: Kazuhiro Nakajima, Ibaraki (JP); Tomotake Nashiki, Ibaraki (JP); Hideo Sugawara, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,625

(22) Filed: Oct. 12, 2011

(65) Prior Publication Data

US 2012/0114919 A1 May 10, 2012

(30) Foreign Application Priority Data

Nov. 4, 2010 (JP) .................................. 2010-247550
Jun. 17, 2011 (JP) .................................. 2011-135443

(51) Int. Cl.
*B32B 3/10* (2006.01)
*B32B 3/14* (2006.01)
(Continued)

(52) U.S. Cl.
CPC .............. *G06F 3/044* (2013.01); *G06F 3/045* (2013.01); *G06F 2203/04103* (2013.01); *Y10T 428/2495* (2015.01); *Y10T 428/24802* (2015.01); *Y10T 428/24868* (2015.01)

(58) Field of Classification Search
CPC ......... G06F 3/044; G06F 3/045; B32B 7/02; B32B 2307/302; B32B 2307/418; B32B 3/10; B32B 3/14; Y10T 428/2495; Y10T 428/24868; Y10T 428/24802; Y10T 428/2486; Y10T 428/248

USPC .............. 428/195.1, 203, 212, 213; 345/173, 345/174, 176
See application file for complete search history.

(56) References Cited

U.S. PATENT DOCUMENTS 5,354,497 A  10/1994  Fukuchi et al.
5,668,576 A   9/1997  Ikura et al.
(Continued)

FOREIGN PATENT DOCUMENTS

CN  1395138 A   2/2003
CN  1881052 A  12/2006
(Continued)

OTHER PUBLICATIONS

Notice of Grounds for Rejection dated May 28, 2013, issued in corresponding Korean Patent Application No. 2011-0113975; with English translation (8 pages).
(Continued)

*Primary Examiner* — Joanna Pleszczynska
(74) *Attorney, Agent, or Firm* — Westerman, Hattori, Daniels & Adrian, LLP

(57) ABSTRACT

The present invention provides a transparent conductive film in which the difference in visibility between the pattern portion and the pattern opening portion is kept small even when a transparent conductive layer is patterned. The transparent conductive film has a first dielectric layer, a second dielectric layer, and a transparent conductive layer in this order on a transparent film substrate, a thickness $d_{21}$ of the first dielectric layer is larger than a thickness $d_{22}$ of the second dielectric layer, the thickness $d_{21}$ of the first dielectric layer is 8 to 40 nm and the thickness $d_{22}$ of the second dielectric layer is 5 to 25 nm, and a difference between the thickness $d_{21}$ of the first dielectric layer and the thickness $d_{22}$ of the second dielectric layer, $d_{21}-d_{22}$, is 3 to 30 nm.

14 Claims, 5 Drawing Sheets

(51) Int. Cl.
  B32B 7/02    (2006.01)
  G06F 3/044   (2006.01)
  G06F 3/045   (2006.01)

(56) References Cited

U.S. PATENT DOCUMENTS

| | | | |
|---|---|---|---|
| 6,720,955 | B2 | 4/2004 | Sugawara et al. |
| 6,743,476 | B2 | 6/2004 | Hishida |
| 7,456,927 | B2 | 11/2008 | Kim |
| 7,534,500 | B2 | 5/2009 | Kobayashi et al. |
| 2002/0158853 | A1 | 10/2002 | Sugawara et al. |
| 2003/0037843 | A1 | 2/2003 | Hishida |
| 2003/0134122 | A1 | 7/2003 | Wickboldt et al. |
| 2003/0194551 | A1 | 10/2003 | Sasa et al. |
| 2004/0265602 | A1 | 12/2004 | Kobayashi et al. |
| 2005/0083307 | A1 | 4/2005 | Aufderheide et al. |
| 2006/0040067 | A1 | 2/2006 | Culp et al. |
| 2006/0232735 | A1 | 10/2006 | Hokazono et al. |
| 2006/0290409 | A1* | 12/2006 | Noguchi et al. ............ 327/517 |
| 2007/0091074 | A1 | 4/2007 | Nashiki et al. |
| 2007/0126707 | A1 | 6/2007 | Jones |
| 2007/0236618 | A1 | 10/2007 | Maag et al. |
| 2008/0020202 | A1* | 1/2008 | Nashiki et al. ............ 428/337 |
| 2008/0138589 | A1 | 6/2008 | Wakabayashi et al. |
| 2008/0176042 | A1 | 7/2008 | Nashiki et al. |
| 2010/0013784 | A1* | 1/2010 | Nashiki et al. ............ 345/173 |
| 2010/0112195 | A1 | 5/2010 | Kodas et al. |
| 2011/0135892 | A1 | 6/2011 | Nashiki et al. |
| 2011/0141059 | A1 | 6/2011 | Nashiki et al. |
| 2011/0141065 | A1 | 6/2011 | Noguchi et al. |
| 2011/0143105 | A1 | 6/2011 | Nashiki et al. |
| 2011/0147340 | A1 | 6/2011 | Nashiki et al. |
| 2012/0114919 | A1 | 5/2012 | Nakajima et al. |

FOREIGN PATENT DOCUMENTS

| | | | |
|---|---|---|---|
| CN | 202502768 | U | 10/2012 |
| JP | 63-304520 | | 12/1988 |
| JP | 7-013695 | A | 1/1995 |
| JP | 7-209514 | A | 8/1995 |
| JP | 07-242442 | A | 9/1995 |
| JP | 07-325313 | A | 12/1995 |
| JP | 2000-301648 | A | 10/2000 |
| JP | 2002-013504 | A | 1/2002 |
| JP | 2002-326301 | A | 11/2002 |
| JP | 2003-114762 | A | 4/2003 |
| JP | 2003-197035 | A | 7/2003 |
| JP | 2003-246972 | A | 9/2003 |
| JP | 2003-297150 | A | 10/2003 |
| JP | 2004-361662 | A | 12/2004 |
| JP | 2006-202756 | A | 8/2006 |
| JP | 2006-261091 | A | 9/2006 |
| JP | 2007-272259 | A | 10/2007 |
| JP | 2008-098169 | A | 4/2008 |
| JP | 2009-076432 | A | 4/2009 |
| JP | 4364938 | B1 | 8/2009 |
| JP | 2010-015861 | A | 1/2010 |
| JP | 2010-228295 | B1 | 10/2010 |
| TW | 200527304 | A | 8/2005 |
| WO | 03/032332 | A1 | 4/2003 |
| WO | 2006-126604 | A1 | 11/2006 |

OTHER PUBLICATIONS

Chinese Office Action dated May 28, 2013, issued in corresponding Chinese Patent Application No. 201110043078.8 with English translation (14 pages).
Japanese Office Action dated Jun. 21, 2013, issued in corresponding Japanese Patent Application No. 2011-002380 with English translation (4 pages).
Japanese Office Action dated Jun. 21, 2013, issued in corresponding Japanese Patent Application No. 2011-002349 with English translation (4 pages).
Japanese Office Action dated Oct. 14, 2010, issued in Japanese Patent Application No. 2008-000700 (4 pages).
Japanese Office Action dated Feb. 9, 2011, issued in Japanese Patent Application No. 2011-002368 with English translation (4 pages).
Korean Office Action date Apr. 11, 2011, issued in Korean Patent Application No. 2008-0004082 with English translation (8 pages).
Japanese Officen Action dated May 6, 2011, issued in Japanese Patent Application No. 2011-002368 with English translation (4 pages).
Taiwanese Office Action dated May 25, 2011, issued in corresponding Taiwanese Patent Application No. 097101511 with English translation (6 pages).
US Non-Final Office Action dated Jun. 2, 2011, issued in U.S. Appl. No. 13/030,598 (081014A) (16 pages).
US Non-Final Office Action dated Jun. 6, 2011, issued in U.S. Appl. No. 13/030,613 (081014B) (18 pages).
US Non-Final Office Action dated May 23, 2011, issued in U.S. Appl. No. 13/030,621 (081014C) (14 pages).
US Non-Final Office Action dated Jun. 1, 2011, issued in U.S. Appl. No. 13/030,629 (081014D) (15 pages).
Korean Office Action dated Oct. 24, 2011, issued in corresponding Korean Patent Application No. 10-2011-0010359 with English translation (8 pages).
Korean Office Action dated Oct. 24, 2011, issued in corresponding Korean Patent Application No. 10-2011-0010360 with English translation (8 pages).
Korean Office Action dated Oct. 24, 2011, issued in corresponding Korean Patent Application No. 10-2011-0010361 with English translation (6 pages).
Korean Office Action dated Oct. 24, 2011, issued in corresponding Korean Patent Application No. 10-2011-0010362 with English translation (8 pages).
Chinese Office Action dated Feb. 2, 2012, issued on corresponding Chinese Patent Application No. 201110043080.5 with English translation (9 pages).
Chinese Office Action dated Apr. 28, 2012, issued in corresponding Chinese Patent Application No. 2011100430077.3, with English translation, (8 pages).
Submission of Information dated Jun. 1, 2012, issued in corresponding Japanese Patent Application No. 2011-002343, with English translation ( 21 pages).
Submission of Information dated Aug. 3, 2013, issued in corresponding Japanese Patent Application No. 2011-002380, with English translation ( 14 pages).
Submission of Information dated Jun. 1, 2012, issued in corresponding Japanese Patent Application No. 2011-002349, with English translation ( 16 pages).
Japanese Office Action dated Aug. 3, 2012, issued in corresponding Japanese Patent Application No. 2011-002380, with English translation (14 pages).
Japanese Office Action dated Aug. 3, 2012, issued in corresponding Japanese Patent Application No. 2011-002343, with English translation (23 pages).
Extended European Search Report dated Sep. 13, 2012, issued in corresponding European Patent Application No. 08000746.1 (6 pages).
Chinese Office Action dated Aug. 2, 2012, issued in corresponding Chinese Patent Application No. 201110043079.2, with English translation (13 pages).
US Non-Final Office Action dated Mar. 25, 2011, issued in related U.S. Appl. No. 12/015,006 (081014) (23 pages).
US Corrected Notice of Allowance dated Apr. 12, 2013, issued in U.S. Appl. No. 13/030,598 (081014A) (12 pages).
Chinese Office Action dated Apr. 28, 2012, issued in corresponding Chinese Patent Application No. 201110043077.3, with English translation, (8 pages).
US Corrected Notice of Allowance dated Apr. 8, 2013, issued in U.S. Appl. No. 13/030,629 (081014D) (11 pages).
Extended European Search Report dated Sep. 27, 2012, issued in corresponding European Patent Application No. 11000663.2 (23 pages).

(56) References Cited

OTHER PUBLICATIONS

Extended European Search Report dated Sep. 27, 2012, issued in corresponding European Patent Application No. 11000666.5 (23 pages).
Extended European Search Report dated Sep. 27, 2012, issued in corresponding European Patent Application No. 11000665.7 (7 pages).
Chinese Office Action dated Dec. 24, 2012, issued in corresponding Chinese Patent Application No. 201110043077.3, with English translation (9 pages).
Japanese Office Action dated Feb. 26, 2013, issued in corresponding Japanese Patent Application No. 2011-002343, with English translation (6 pages).
US Notice of Allowance dated Feb. 21, 2013, issued in related U.S. Appl. No. 12/015,006 (081014) (10 pages).
US Final Office Action dated Jul. 26, 2012, issued in related U.S. Appl. No. 12/015,006 (081014) (27 pages).
US Final Office Action dated Dec. 12, 2011, issued in related U.S. Appl. No. 12/015,006 (081014) (13 pages).
US Corrected Notice of Allowance dated Apr. 11, 2013, issued in U.S. Appl. No. 12/015,006 (081014) (12 pages).
Taiwanese Office Action dated Dec. 10, 2013, issued in corresponding Taiwanese Patent Application No. 100137770 with English translation (9 pages).
US Final Office Action dated Dec. 22, 2011, issued in U.S. Appl. No. 13/030,629 (081014D) (22 pages).
Chinese Office Action dated Dec. 4, 2013, issued in corresponding Chinese Patent Application No. 201110332529.X with English translation (20 pages).
US Final Office Action dated Dec. 22, 2011, issued in U.S. Appl. No. 13/030,598 (081014A) (23 pages).
US Final Office Action dated Jul. 25, 2012, issued in U.S. Appl. No. 13/030,598 (081014A) (27 pages).
US Notice of Allowance dated Feb. 22, 2013, issued in U.S. Appl. No. 13/030,598 (081014A) (30 pages).
US Notice of Allowance dated Feb. 22, 2013, issued in U.S. Appl. No. 13/030,629 (081014D) (30 pages).
US Final Office Action dated Jul. 25, 2012, issued in U.S. Appl. No. 13/030,629 (081014D) (28 pages).
Notice of Final Rejection dated Jan. 28, 2014, issued in corresponding Korean application No. 2011-0113975, w/ English translation (6 pages).
Korean Decision dated Oct. 30, 2014, issued in corresponding Korean Patent Application No. 10-2011-0113975, w/English translation (28 pages).
Office Action dated Jan. 6, 2015, issued in Japanese Application No. 2011-135443, w/English translation. (5 pages).
Chinese Office Action dated Jun. 4, 2014, issued in corresponding Chinese Patent Application No. 201110043078.8, w/English tranlsation (19 pages).
Chinese Office Action dated Oct. 14, 2014, issued in corresponding CN application No. 201110332529.X with English translation (15 pages).
Office Action dated Jan. 26, 2016, issued in counterpart Japanese Patent Application No. 2015-089255, with English translation. (6 pages).

* cited by examiner

TRANSPARENT CONDUCTIVE FILM AND TOUCH PANEL

BACKGROUND OF THE INVENTION

Field of the Invention

The present invention relates to a transparent conductive film having a film substrate and a transparent conductive layer provided thereon via a dielectric layer, and a method of manufacturing the same. The transparent conductive film of the present invention can be suitably used in touch panel applications. Above all, the transparent conductive film can be suitably used in a touch panel having a transparent conductive layer that is patterned in a prescribed shape such as a projection capacitive type touch panel and a resistive film type touch panel (a matrix resistive film type touch panel) that is capable of multi-point input. Further, the present invention relates to a touch panel having the transparent conductive film.

Description of the Related Art

Because a projection capacitive type touch panel and a matrix resistive film type touch panel are capable of multi-point input (multi touch), they are excellent in operability, and demands therefor have been increasing rapidly in recent years. A transparent conductive film having a patterned transparent conductive layer on a transparent film substrate via two dielectric layers is used in these touch panels. In such transparent conductive films, a difference in visibility of the pattern occurs between a portion where the transparent conductive layer is formed (a pattern portion) and a portion where the transparent conductive layer is not formed (a pattern opening portion), and the pattern is sometimes seen through from the outside. As the quality of touch panels becomes higher, further reduction of the difference in visibility is desired.

From the viewpoint of suppressing such a difference in visibility due to the presence or absence of a transparent conductive layer, it has been proposed that the refractive index and the like of the dielectric layer are adjusted in a prescribed range by providing a plurality of dielectric layers between the film substrate and the transparent conductive layer (for example, Japanese Patent Application Laid-Open Nos. 2010-15861 and 2008-98169 and Japanese Patent No. 4364938).

SUMMARY OF THE INVENTION

The present inventors actually produced the transparent conductive films as disclosed in Japanese Patent Application Laid-Open Nos. 2010-15861 and 2008-98169 and Japanese Patent No. 4364938 and evaluated them. As a result, it was found that a difference in visibility between the pattern portion and the pattern opening portion was still observed in these films. In view of this, an object of the present invention is to provide a transparent conductive film in which a difference in visibility between the pattern portion and the pattern opening portion can be suppressed even when the transparent conductive layer is patterned, and a method of manufacturing the same. Another object of the present invention is to provide a touch panel having the transparent conductive film.

The present inventors intensively studied to solve the above-described problem. As a result, it was found that the above-described objects can be achieved by adopting the following configuration, and the present invention was completed.

The transparent conductive film 100 of the present invention comprises a first dielectric layer 21, a second dielectric layer 22, and a transparent conductive layer 3 in this order on a transparent film substrate 1. A thickness $d_{21}$ of the first dielectric layer is larger than a thickness $d_{22}$ of the second dielectric layer. It is preferable that the thickness $d_{21}$ of the first dielectric layer is 8 to 40 nm and the thickness $d_{22}$ of the second dielectric layer is 3 to 25 nm. A difference between the thickness $d_{21}$ of the first dielectric layer and the thickness $d_{22}$ of the second dielectric layer, $d_{21}-d_{22}$, is preferably 3 to 30 nm.

In one embodiment, it is preferable that the first dielectric layer 21 is formed by wet coating. It is also preferable that the second dielectric layer 22 is formed by wet coating.

In a preferable embodiment, a refractive index of the first dielectric layer is larger than a refractive index of the second dielectric layer. More preferably, a refractive index $n_1$ of the transparent film substrate, a refractive index $n_{21}$ of the first dielectric layer, a refractive index $n_{22}$ of the second dielectric layer, and a refractive index $n_3$ of the transparent conductive layer 3 satisfy the relationship $n_{22}<n_{21}<n_1<n_3$.

The refractive index $n_{21}$ of the first dielectric layer 21 is preferably 1.5 to 1.7. The refractive index $n_{22}$ of the second dielectric layer 22 is preferably 1.4 to 1.5. A difference, $n_3-n_{22}$, between the refractive index $n_3$ of the transparent conductive layer and the refractive index $n_{22}$ of the second dielectric layer is preferably 0.1 or more. The refractive index in the present specification represents a value measured at wavelength 589.3 nm (Sodium D line) unless otherwise specified.

In one embodiment, the transparent conductive film 100 has a pattern portion P that has the transparent conductive layer on the second dielectric layer 22 and a pattern opening portion that does not have the transparent conductive layer. According to this embodiment, preferably, the second dielectric layer 22 is patterned similarly to the transparent conductive layer 3.

In one embodiment, if the transparent conductive layer 3 is patterned, a difference ΔR in reflectance between reflected light when irradiating the pattern portion with white light and reflected light when irradiating a region directly under the pattern opening portion with white light is preferably 1% or less. And, a color difference ΔE between reflected light at the pattern portion and reflected light at a region directly under the pattern opening portion is preferably 6.7 or less.

The transparent conductive film in which the transparent conductive layer is patterned is manufactured by forming a first dielectric layer, a second dielectric layer, and a transparent conductive layer on a transparent film substrate sequentially, and then patterning the transparent conductive layer by etching with acid. Further, when the second dielectric layer is patterned, the second dielectric layer can be etched by etching with alkali to be patterned. When the transparent conductive layer is crystallized by heating, it is preferable that the transparent conductive layer is crystallized by heating after the transparent conductive layer is patterned.

The transparent conductive film described above is preferably used for a touch panel that is of a projection capacitive type or a matrix resistive film type. Further, the present invention relates to a touch panel including the transparent conductive film.

In the transparent conductive film 100 of the present invention, because the thickness and the like of the dielectric layers 21 and 22 between the transparent film substrate 1 and the transparent conductive layer 3 are in a prescribed range, the difference in visibility, especially the difference in reflectance, between the pattern portion P and a pattern opening portion O can be kept small even when the transparent conductive layer is patterned. Because the first dielectric layer 21 on the transparent film substrate 1 has a prescribed thickness, deterioration of visibility due to precipitation of an oligomer from the transparent film substrate can also be suppressed.

Because of that, the transparent conductive film of the present invention can also be suitably used in a touch panel in which a patterned transparent conductive layer is used, such as a projection capacitive type touch panel and a matrix resistive film type touch panel.

DESCRIPTION OF THE PREFERRED EMBODIMENTS

Figure 1:
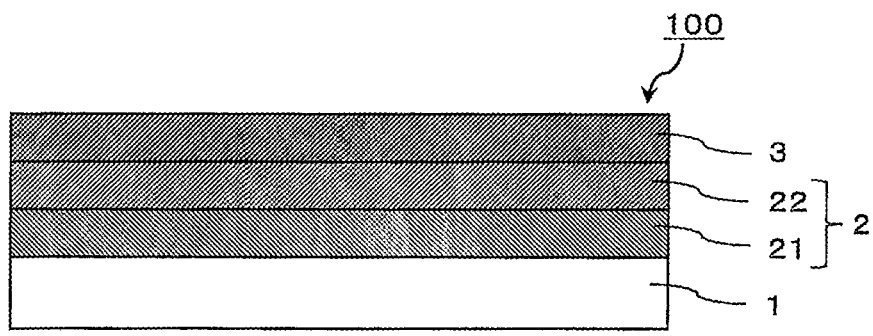
FIG. 1 is a schematic cross-sectional view of a transparent conductive film according to one embodiment of the present invention.
Figure 2:
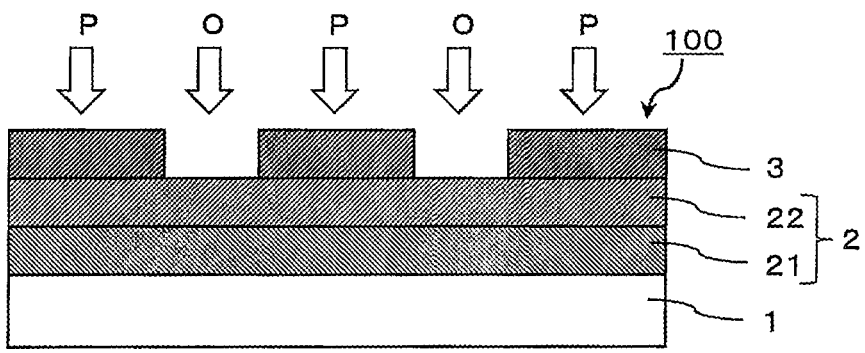
FIG. 2 is a schematic cross-sectional view of a transparent conductive film according to one embodiment of the present invention.
Figure 3:
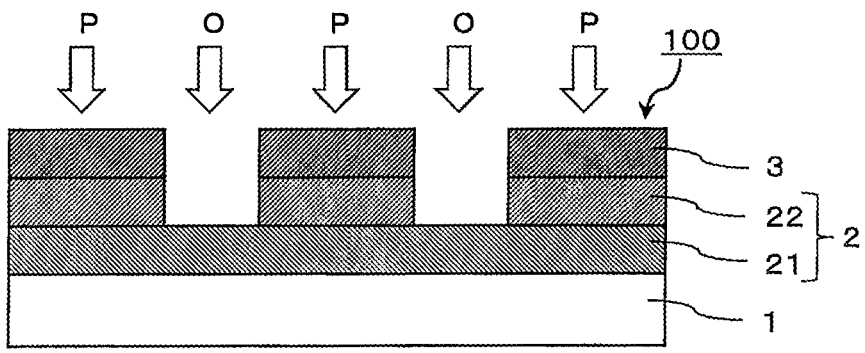
FIG. 3 is a schematic cross-sectional view of a transparent conductive film according to one embodiment of the present invention.

Embodiments of the present invention will be explained below by referring to the drawings. Each of FIGS. 1 to 3 is a cross-sectional view schematically showing an embodiment of the transparent conductive film of the present invention. In a transparent conductive film 100 of FIGS. 1 to 3, a transparent conductive layer 3 is formed on one side of a transparent film substrate 1 via a dielectric layer 2. The dielectric layer 2 is formed of two layers of a first dielectric layer 21 and a second dielectric layer 22 from the transparent film substrate 1 side. In the embodiments of FIGS. 2 and 3, the transparent conductive film 100 has a pattern portion P where the transparent conductive layer 3 is formed on the second dielectric layer 22 and a pattern opening portion O where the transparent conductive layer 3 is not formed. In the embodiment of FIG. 3, the second dielectric layer 22 is also patterned to have a pattern portion P and a pattern opening portion O similarly to the transparent conductive layer.

There is no particular limitation to the transparent film substrate 1, and various types of plastic films having transparency may be used. Examples of the material for the transparent film substrate 1 include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. Among these, polyester resins, polycarbonate resins, and polyolefin resins are particularly preferred.

From the viewpoint of effectively reducing the difference in reflectance between the pattern portion P and the pattern opening portion O when the transparent conductive film of the embodiment of FIG. 1 is patterned to have the pattern portion P and the pattern opening portion O as in the embodiments of FIGS. 2 and 3, the refractive index of the transparent film substrate 1 is preferably 1.45 or more, more preferably 1.50 to 1.70, further preferably 1.55 to 1.70, and especially preferably 1.60 to 1.70. From the viewpoint of setting the refractive index to the above-described range, a polyester resin such as polyethylene terephthalate and polyethylene naphthalate can be suitably used as a material of the transparent film substrate 1.

The thickness of the transparent film substrate 1 is preferably in a range of 2 to 200 μm and more preferably in a range of 2 to 100 μm. When the thickness of the transparent film substrate 1 is less than 2 μm, the mechanical strength of the transparent film substrate 1 becomes insufficient and the operation of forming the dielectric layer 2 and the transparent conductive layer 3 successively by making the film substrate into a roll may become difficult. On the other hand, when the thickness exceeds 200 μm, the scratch resistance of the transparent conductive layer 3 and tap property for a touch panel may not be improved.

The surface of the transparent film substrate 1 may be previously subjected to sputtering, corona discharge treatment, flame treatment, ultraviolet irradiation, electron beam irradiation, chemical treatment, etching treatment such as oxidation, or undercoating treatment such that the adhesion of the transparent film substrate 1 to the first dielectric layer 21 formed on the film substrate can be improved. If necessary, the surface of the film substrate may also be subjected to dust removing or cleaning by solvent cleaning, ultrasonic cleaning or the like, before the dielectric layer is formed.

The transparent dielectric layers 21 and 22 are provided between the transparent film substrate 1 and the transparent conductive layer 3 and do not function as conductive layers. In other words, the transparent dielectric layers function to secure insulation between the adjacent pattern portions P, P of the transparent conductive layer 3. Therefore, the transparent dielectric layers 21 and 22 each have a surface resistance of $1 \times 10^6$ Ω/square or more, preferably $1 \times 10^7$ Ω/square or more, more preferably $1 \times 10^8$ Ω/square or more. The surface resistance of the transparent dielectric layer does not have any particular upper limit. While the surface resistance of the transparent dielectric layer may generally has an upper limit of about $1 \times 10^{13}$ Ω/square, which corresponds to a measuring limit, it may be higher than $1 \times 10^{13}$ Ω/square.

The materials of the dielectric layer include an inorganic material such as NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses is the refractive index of each material, an organic material such as acrylic resins, urethane resins, melamine resins, alkyd resins, siloxane polymers, and organosilane condensates, which have an refractive index of about 1.4 to 1.6, and a mixture of the inorganic material and the organic material.

Among the above-described materials, an organic substance or a mixture of an organic substance and an inorganic substance is preferably used as the material of the first dielectric layer 21. Especially, a thermosetting resin including a mixture of a melamine resin, an alkyd resin, and an organic silane condensate as the organic substance is desirably used. When the first dielectric layer 21 is an organic substance, the embodiment shown in FIG. 3 can also be easily carried out because it is possible to avoid a situation that the first dielectric layer 21 is patterned by etching when the transparent conductive layer 3 and the second dielectric layer 22 are patterned by etching.

The material of the second dielectric layer 22 is preferably an inorganic substance or a mixture of an organic substance and an inorganic substance. As the inorganic substance, $SiO_2$, $MgF_2$, or $Al_2O_3$ is preferable, and among these, $SiO_2$ is preferable. When the second dielectric layer 22 is an inorganic substance, the embodiment shown in FIG. 3 can be easily carried out because patterning by etching is possible.

The first dielectric layer 21 and the second dielectric layer 22 can be formed using the above-described materials by a dry coating method such as vacuum vapor deposition, sputtering, and ion plating, and a wet coating method (painting) and the like. Among these, the first dielectric layer 21 is preferably formed by a wet coating method. The surface of the transparent film substrate is uneven generally due to the presence of a filler, or the like in the film. However, when the first dielectric layer 21 is formed by a wet coating method, a uniform film with reduced unevenness of the surface of the substrate is easily formed. Because of that, the surface of the dielectric layer 2 can also be made smooth, and it is possible to obtain good film quality of the transparent conductive layer 3 that is formed on the dielectric layer 2. When indium oxide (ITO) containing tin oxide is formed as the transparent conductive layer 3 for example, the crystallization time of the transparent conductive layer can also be shortened if the surface of the dielectric layer 2 that is an under layer is smooth. From such a viewpoint, the second dielectric layer 22 is also preferably formed by a wet coating method.

By forming the first dielectric layer 21 by a wet coating method, precipitation of an oligomer from the transparent film substrate 1 can be suppressed. In general, when a polymer is heated, an oligomer generated by depolymerization may precipitate to the film surface, and this tendency is noticeable especially in a condensed polymer such as polyester. The oligomer precipitates from the film substrate by heating when forming the transparent conductive layer 3 or when annealing (crystallizing) the transparent conductive layer 3, and this precipitation of the oligomer may hinder crystallization of the transparent conductive layer 3 and the visibility of the transparent conductive film may be adversely affected. Contrary to this, when the dielectric layer 21 on the transparent film substrate 1 is formed by wet coating, generation of such bad influence due to the precipitation of an oligomer as described above can be suppressed because the dielectric layer 21 can function also as an oligomer sealing layer.

From the viewpoint of suppressing the precipitation of an oligomer from the transparent film substrate 1, the thickness $d_{21}$ of the first dielectric layer 21 is preferably 8 nm or more, more preferably 10 nm or more, and further preferably 15 nm or more.

The thickness $d_{21}$ of the first dielectric layer 21 is preferably larger than the thickness $d_{22}$ of the second dielectric layer 22. By making the thickness of the first dielectric layer larger than that of the second dielectric layer, a difference in a shape of a reflection spectrum in a visible light region between the pattern portion P and the pattern opening portion O becomes small and a difference in a hue between both the regions becomes small. As a result, it becomes difficult to visually recognize the pattern. Further, the thickness $d_{21}$ of the first dielectric layer 21 is preferably 8 to 40 nm, more preferably 10 to 35 nm, and further preferably 15 to 35 nm. The thickness $d_{22}$ of the second dielectric layer 22 is preferably 3 to 25 nm, more preferably 5 to 20 nm, and further preferably 5 to 15 nm. When the thickness of each layer is in the above-described range, transparency can be secured and the difference in reflectance between the pattern portion P and the pattern opening portion O can be effectively reduced, and a transparent conductive film excellent in visibility can be formed even when the transparent conductive layer 3 is patterned to have a pattern portion P and a pattern opening portion O. It is important to make the difference $d_{21}$-$d_{22}$ between the thickness $d_{21}$ of the first dielectric layer 21 and the thickness $d_{22}$ of the second dielectric layer 22 small in the present invention in order to make the difference in visibility between the pattern portion P and the pattern opening portion O of the transparent conductive layer 3 small. From such a viewpoint, the difference $d_{21}$-$d_{22}$ in thickness in the transparent conductive film of the present invention is 3 to 30 nm and preferably 5 to 30 nm.

The "reflectance" in the present specification refers to an average value of reflectance measured at intervals of 5 nm in a visible light region (wavelength 380 to 780 nm) unless otherwise specified. The "hue" is an L* value, an a* value, and b* value in the L*a*b* color specification system defined in JIS Z8729. The "color difference" is a value represented by $$\Delta E=\{(\Delta L^*)^2+((\Delta a^*)^2+(\Delta b^*)^2\}0.5$$

using $\Delta L^*$ as a difference of L*, $\Delta a^*$ as a difference of a*, and $\Delta b^*$ as a difference of b*.

When the transparent conductive layer 3 in the transparent conductive film of the present invention is patterned, a difference $\Delta R$ in reflectance between reflected light when irradiating the pattern portion with white light and reflected light when irradiating a region directly under the pattern opening portion with white light is preferably 1% or less. A color difference $\Delta E$ between the reflected light at the pattern portion and the reflected light at the region directly under the pattern opening portion is preferably 6.7 or less.

When the transparent conductive layer 3 is patterned, a refractive index $n_{21}$ of the first dielectric layer 21 is preferably larger than a refractive index $n_{22}$ of the second dielectric layer 22 from the viewpoint of further suppressing a reflectance in reflectance between the pattern portion and the pattern opening portion. Further, the refractive index $n_{21}$ of the first dielectric layer 21 is preferably 1.5 to 1.7, more preferably 1.5 to 1.65, and further preferably 1.5 to 1.6. The refractive index $n_{22}$ of the second dielectric layer 22 is preferably 1.4 to 1.5, more preferably 1.41 to 1.49, and further preferably 1.42 to 1.48.

When the transparent conductive layer 3 is patterned, from the viewpoint of suppressing a difference in hue between the pattern portion and the pattern opening portion in addition to suppressing the difference in reflectance of both the regions, not only magnitude correlation of the refractive index between the first dielectric layer 21 and the second dielectric layer 22 but also magnitude correlation of the refractive index between the transparent film substrate 1 and the transparent conductive layer 3 are preferably controlled. That is, a refractive index $n_1$ of the transparent film substrate, a refractive index $n_{21}$ of the first dielectric layer, a refractive index $n_{22}$ of the second dielectric layer, and a refractive index $n_3$ of the transparent conductive layer 3 preferably satisfy $n_{22}<n_{21}<n_1<n_3$. A difference $n_3-n_{22}$ between the refractive index $n_3$ of the transparent conductive layer 3 and the refractive index $n_{22}$ of the second dielectric layer is preferably 0.1 or more, more preferably 0.1 to 0.9, and further preferably 0.2 to 0.8.

Because the transparent conductive layer is generally formed from a metal oxide, the refractive index is high, and the reflectance at the surface is high. On the other hand, the refractive index of the dielectric layer directly under the pattern opening portion when the transparent conductive layer 3 is patterned is low as compared to that of the transparent conductive layer, and the reflectance at the surface is low. Because of that, a difference in reflectance occurs between the pattern portion P and the pattern opening portion O, and there is a tendency that the pattern is easily visually recognized. Contrary to this, in the present invention, the reflected light at the surface of the transparent conductive layer is canceled out by interference due to interface multi-reflection by providing two dielectric layers having different refractive indexes between the transparent film substrate 1 and the transparent conductive layer 3 and by adjusting the thickness and the refractive index thereof to the above-described range, and the reflectance at the pattern portion P can be reduced. Because of that, the difference in the reflectance between the pattern portion P and the pattern opening portion O is reduced, and it becomes difficult to visually recognize the pattern.

By making the refractive index of the first dielectric layer larger as compared to that of the second dielectric layer, there is a tendency that a difference in spectrum shape between the pattern portion and the pattern opening portion becomes small in addition to the reduction in the difference in reflectance. From the viewpoint of reducing the difference in the reflectance between the pattern portion P and the pattern opening portion O, the second dielectric layer 22 is preferably patterned in the pattern opening portion similarly to the transparent conductive layer 3 as shown in FIG. 3. Because the refractive index of the first dielectric layer 21 is larger as compared to that of the second dielectric layer 22 and the reflectance at the surface is large, reflection at the pattern opening portion becomes large and the difference in reflectance to that of the pattern portion is further reduced when the second dielectric layer is patterned and the first dielectric layer is exposed.

As described above, transparent conductive layer having a larger refractive index than that of the second dielectric layer is preferably used as the transparent conductive layer 3. The refractive index $n_3$ of the transparent conductive layer 3 is normally about 1.95 to 2.05.

Examples of materials that may be used to form the transparent conductive layer 3 are not limited, but oxides of at least one metal selected from the group consisting of indium, tin, zinc, gallium, antimony, titanium, silicon, zirconium, magnesium, aluminum, gold, silver, copper, palladium, and tungsten are preferably used. Such metal oxides may be optionally added with any metal atom selected from the above group. For example, indium oxide containing tin oxide (ITO) or tin oxide containing antimony (ATO) is preferably used.

The thickness of the transparent conductive layer 3 is not especially limited. However, the thickness is preferably 10 nm or more to make the transparent conductive layer 3 be a continuous film having good conductivity of which surface resistance is $1\times10^3$ W/square or less. When the film thickness is too large, a decrease of the transparency, or the like is brought about, and therefore the thickness is preferably 15 to 35 nm and more preferably 20 to 30 nm. When the thickness of the transparent conductive layer is less than 15 nm, the electric resistance of the film surface becomes high and it is difficult to form a continuous film. When the thickness of the transparent conductive layer exceeds 35 nm, a decrease of transparency, or the like may be brought about.

The method of forming the transparent conductive layer 3 is not especially limited, and a conventionally known method can be adopted. Specific examples of the method include a vacuum vapor deposition method, a sputtering method, and an ion plating method. An appropriate method can be adopted according to the required film thickness. The transparent conductive layer 3 can be crystallized by carrying out a heating annealing treatment as necessary after formation.

When the transparent conductive layer 3 is to be patterned by etching, etching may become difficult if crystallization of the transparent conductive layer 3 is performed in advance. Because of that, the annealing treatment of the transparent conductive layer 3 is preferably performed after patterning the transparent conductive layer 3. When the second dielectric layer 22 is also patterned by etching, the annealing treatment of the transparent conductive layer 3 is preferably performed after etching the transparent conductive layer 3 and the dielectric layer 22.

A total of optical thicknesses of the first dielectric layer 21 and the second dielectric layer 22 in the transparent conductive film of the present invention is preferably 10 to 120 nm, more preferably 15 to 100 nm, and further preferably 20 to 80 nm. A total of optical thicknesses of the first dielectric layer 21, the second dielectric layer 22, and the transparent conductive layer 3 is preferably 45 to 155 nm, more preferably 50 to 140 nm, and further preferably 55 to 130 nm. The optical thickness is represented by the product of the refractive index and the thickness.

As shown in FIGS. 2 and 3, when the transparent conductive layer 3 is patterned, from the viewpoint of reducing the difference in the reflectance between the pattern portion P and the pattern opening portion O, a difference between the total of the optical thicknesses of the pattern portion and the total of the optical thicknesses of the pattern opening portion is preferably 35 to 90 nm, more preferably 40 to 80 nm, and further preferably 25 to 70 nm.

Figure 4:
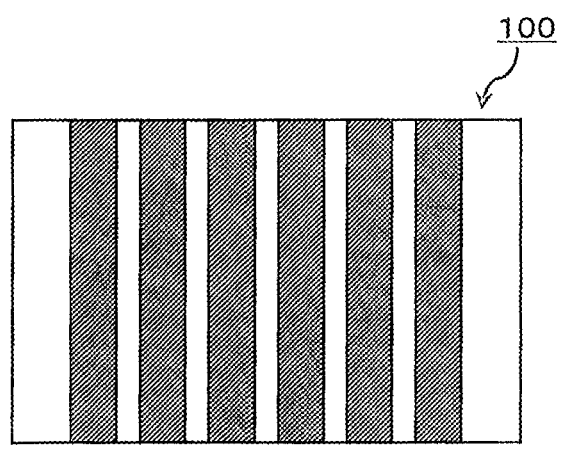
FIG. 4 is a schematic plan view of a transparent conductive film according to one embodiment of the present invention.

The transparent conductive layer 3 and the second dielectric layer 22 can be patterned in various pattern shapes according to the use to which the transparent conductive film is applied. An example of the pattern shape is a shape in which each of the pattern portions P is formed in a rectangular shape and the pattern portions P and the pattern opening portions O are arranged in stripes. FIG. 4 is a schematic plan view of the transparent conductive film 100 of the present invention and one example of the embodiment in which the transparent conductive layer is patterned in stripes. In FIG. 4, the width of the pattern portion P is shown to be larger than that of the pattern opening portion O. However, the present invention is not limited to such an embodiment.

A method of manufacturing the transparent conductive film of the present invention is not especially limited as long as the dielectric layers 21 and 22 and the transparent conductive layer 3 are laminated on one surface or both surfaces of the transparent film substrate 1 as described above. For example, the transparent conductive film can be manufactured by producing a transparent conductive film having the transparent conductive layer 3 via the dielectric layers 21 and 22 on one surface or both surfaces of the transparent film substrate from the transparent substrate 1 side and then patterning the transparent conductive layer 3 and the second dielectric layer 22 by etching as necessary according to a normal method. A method of etching the transparent conductive layer 3 and the second dielectric layer 22 with an etchant while covering the pattern portion P with a mask for forming a pattern is suitably used for etching.

Because indium oxide containing tin oxide and tin oxide containing antimony are suitably used for the transparent conductive layer 3, an acid is suitably used as the etchant. Examples of the acid include inorganic acids such as hydrogen chloride, hydrogen bromide, sulfuric acid, nitric acid, and phosphoric acid, organic acids such as acetic acid, mixtures of these, and aqueous solutions of these.

When the second dielectric layer 22 is patterned by etching similarly to the transparent conductive layer 3, the second dielectric layer 22 is preferably etched with an etchant while covering the pattern portion P with the same mask as that used when etching the transparent conductive layer 3. Because an inorganic substance such as $SiO_2$ can be suitably used for the second dielectric layer 22 as described above, an alkali is suitably used as an etchant. Examples of the alkali include aqueous solutions of sodium hydroxide, potassium hydroxide, ammonia, tetramethylammonium hydroxide, and the like and mixtures of these. When the second dielectric layer is patterned by etching, the first dielectric layer 21 is preferably formed with an organic substance that cannot be etched by an acid or an alkali as described above.

Modified examples and lamination configurations of the transparent conductive film of the present invention are explained below referring to the drawings. The dielectric layers are shown as one layer 2 in FIGS. 5 to 12 for simplicity. However, any of the layers 2 in these drawings has the first dielectric layer and the second electrical layer from the transparent film substrate 1 side.

Figure 5:
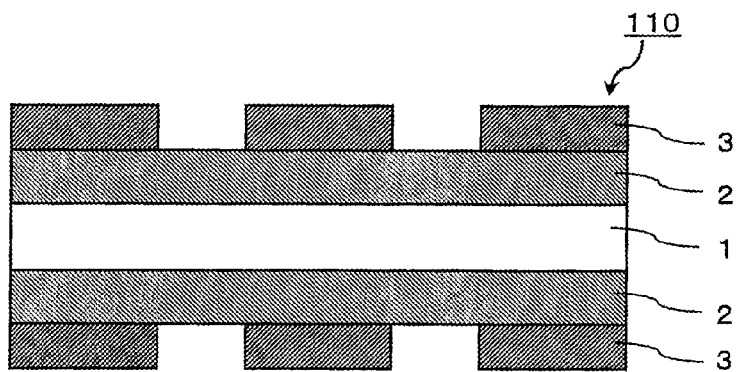
FIG. 5 is a schematic cross-sectional view of a transparent conductive film according to one embodiment of the present invention.

FIG. 5 is a cross-sectional view showing an embodiment in which the transparent conductive layer 3 is formed on both sides of the transparent film substrate 1. In a transparent conductive film 110 of FIG. 5, the transparent conductive layer 3 is formed on both surfaces of the transparent film substrate 1 via the dielectric layer 2. A configuration in which only the transparent conductive layer 3 is patterned is shown in FIG. 5 similarly to FIG. 2. However, a configuration in which the transparent conductive layer 3 is not patterned as in FIG. 1 and a configuration in which the second dielectric layer 22 is patterned similarly to the transparent conductive layer 3 as in FIG. 3 can also be adopted. The transparent conductive layer 3 is patterned on both sides of the transparent film substrate 1 in FIG. 5. However, only one side of the transparent conductive layer 3 may be patterned. A configuration can be adopted in which the transparent conductive layer and the second dielectric layer are patterned on one side of the transparent film substrate and only the transparent conductive layer is patterned on the other side. The same also applies to the embodiments of FIGS. 6 to 9 and FIG. 11 having two or more transparent conductive layers 3.

The pattern portion and the pattern opening portion of the transparent conductive layer 3 on both sides of the transparent film substrate 1 are consistent to each other in FIG. 5. However, they do not have to be consistent to each other, and a configuration can also be adopted in which the transparent conductive layer 3 is appropriately patterned on both sides of the transparent film substrate in various modes. The same also applies to the embodiments of FIGS. 6 to 9 and FIG. 11 having two or more transparent conductive layers 3.

FIGS. 6 to 9 are also each a cross-sectional view showing one example of the transparent conductive film of the present invention. The transparent conductive film of FIGS. 6 to 9 represents a configuration in which two transparent conductive films 100 shown in FIG. 2 or 5 are laminated via a transparent pressure-sensitive adhesive layer 4. In the embodiments of FIGS. 6 to 9, transparent conductive films 151 to 154 obtained by lamination are preferably laminated so that the patterned transparent conductive layer 3 is arranged on at least one surface of the film.

Figure 6:
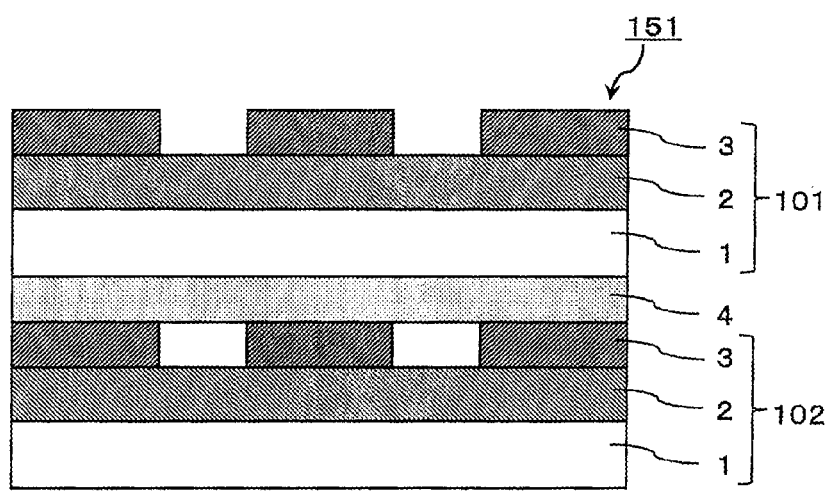
FIG. 6 is a schematic cross-sectional view showing a lamination configuration of a transparent conductive film.
Figure 7:
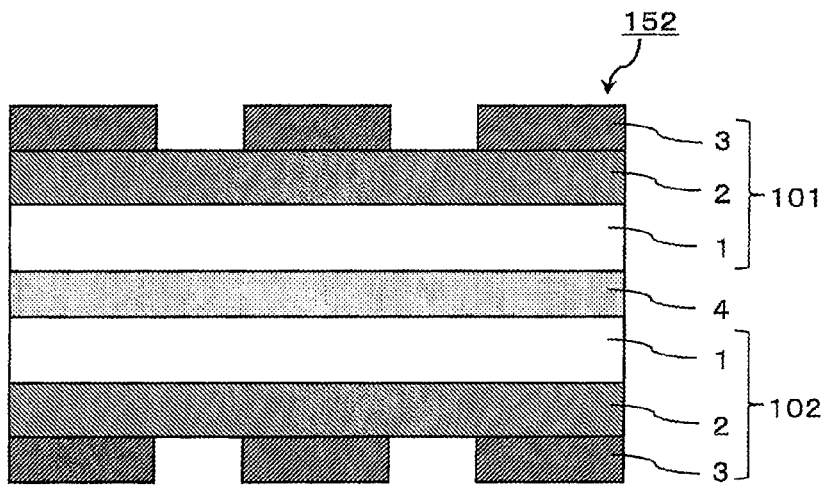
FIG. 7 is a schematic cross-sectional view showing a lamination configuration of a transparent conductive film.

In FIGS. 6 and 7, two transparent conductive films 100 of FIG. 2 are laminated via the transparent pressure-sensitive adhesive layer 4. The transparent conductive film 151 of FIG. 6 has a configuration in which the transparent conductive layer 3 of another transparent conductive film 102 is laminated on the transparent film substrate 1 of the transparent conductive film 101 of FIG. 2 via the transparent pressure-sensitive adhesive layer 4. The transparent conductive film 152 of FIG. 7 has a configuration in which the transparent film substrates 1 of the transparent conductive films 101 and 102 shown in FIG. 2 are laminated onto each other via the transparent pressure-sensitive adhesive layer 4.

Figure 8:
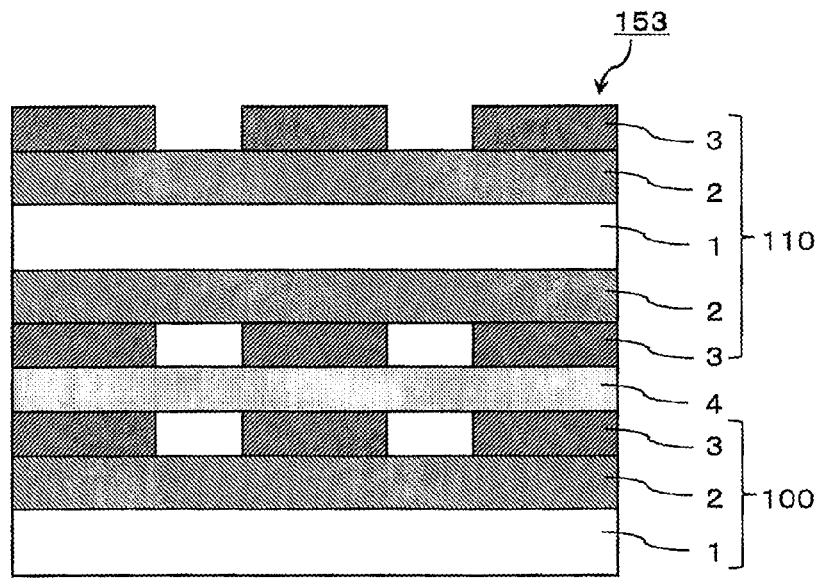
FIG. 8 is a schematic cross-sectional view showing a lamination configuration of a transparent conductive film.
Figure 9:
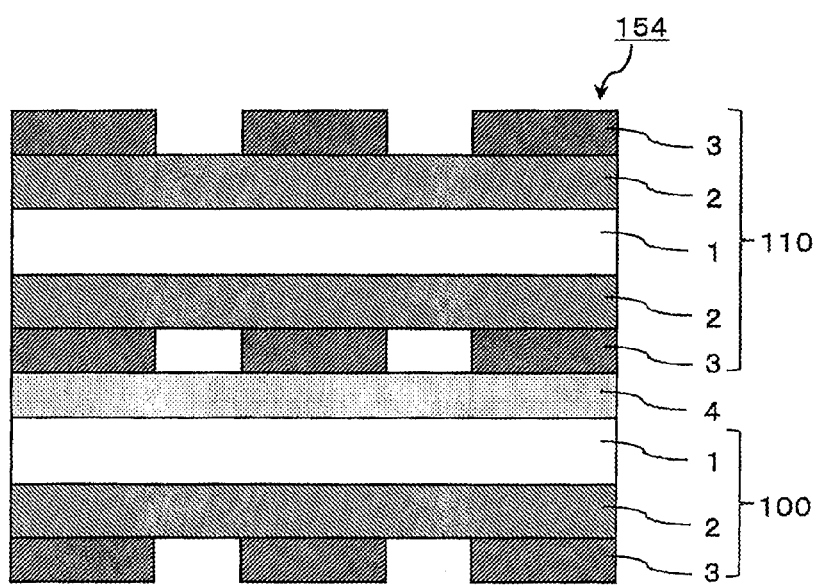
FIG. 9 is a schematic cross-sectional view showing a lamination configuration of a transparent conductive film.

In FIGS. 8 and 9, the transparent conductive film 100 of FIG. 2 and the transparent conductive film 110 of FIG. 5 are laminated via the transparent pressure-sensitive adhesive layer 4. The transparent conductive film 153 of FIG. 8 has a configuration in which the transparent conductive layer 3 of the transparent conductive film 100 of FIG. 2 and the transparent conductive layer 3 of one surface of the transparent conductive film 110 of FIG. 5 are laminated via the transparent pressure-sensitive adhesive layer 4. The transparent conductive film 154 of FIG. 9 has a configuration in which the transparent film substrate 1 of the transparent conductive film 100 of FIG. 2 and the transparent conductive layer 3 of one surface of the transparent conductive film 110 of FIG. 5 are laminated via the transparent pressure-sensitive adhesive layer 4.

In FIGS. 6 to 9, an example is shown in which two transparent conductive films of FIG. 2 and/or FIG. 5 are laminated via the transparent pressure-sensitive adhesive layer 4. However, two or three or more of the transparent conductive films of FIG. 2 and/or FIG. 5 can be appropriately combined according to the embodiments of FIGS. 6 to 9.

Figure 10:
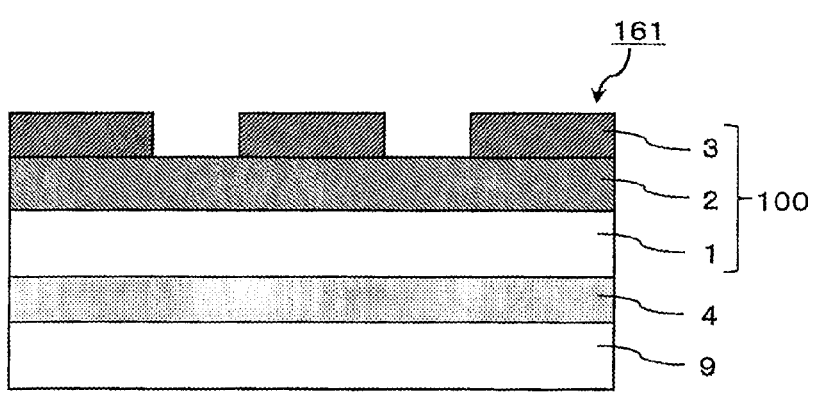
FIG. 10 is a schematic cross-sectional view showing a lamination configuration of a transparent conductive film.
Figure 11:
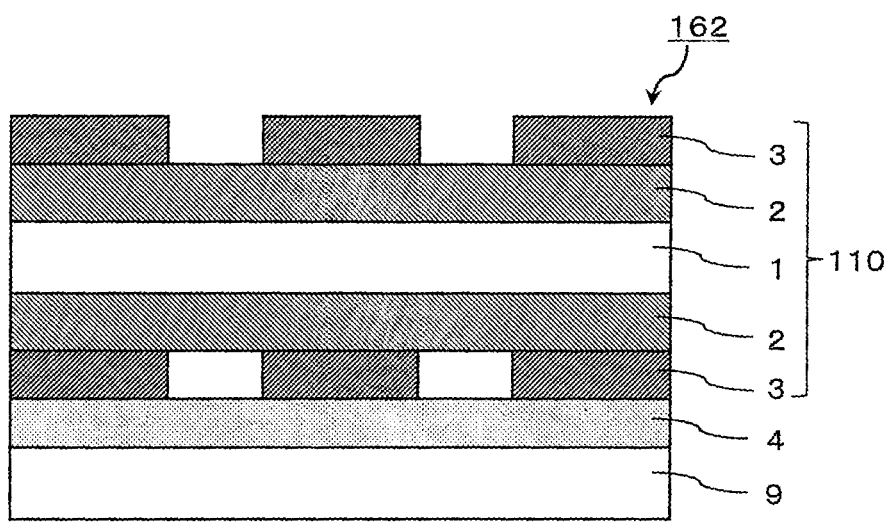
FIG. 11 is a schematic cross-sectional view showing a lamination configuration of a transparent conductive film.

The transparent conductive film of the present invention can be used in a mode in which the pressure-sensitive adhesive layer 4 is provided. The pressure-sensitive adhesive layer 4 is laminated so that the transparent conductive layer 3 is arranged on one surface of the transparent conductive film. FIG. 10 shows a transparent conductive film 161 in which the transparent pressure-sensitive adhesive layer 4 is laminated on the transparent film substrate 1 of the transparent conductive film 100 shown in FIG. 2. FIG. 11 shows a transparent conductive film 162 in which the transparent pressure-sensitive adhesive layer 4 is laminated on the transparent conductive layer 3 of one surface of the transparent conductive film shown in FIG. 5. A separator 9 may be provided on the exposed surface of the pressure-sensitive adhesive layer 4 as shown in FIGS. 10 and 11. As shown in FIGS. 6 to 9, the pressure-sensitive adhesive layer 4 can be laminated so that the transparent conductive layer 3 is arranged on one surface of the transparent conductive film also in the case in which two or more transparent conductive films are laminated.

Figure 12:
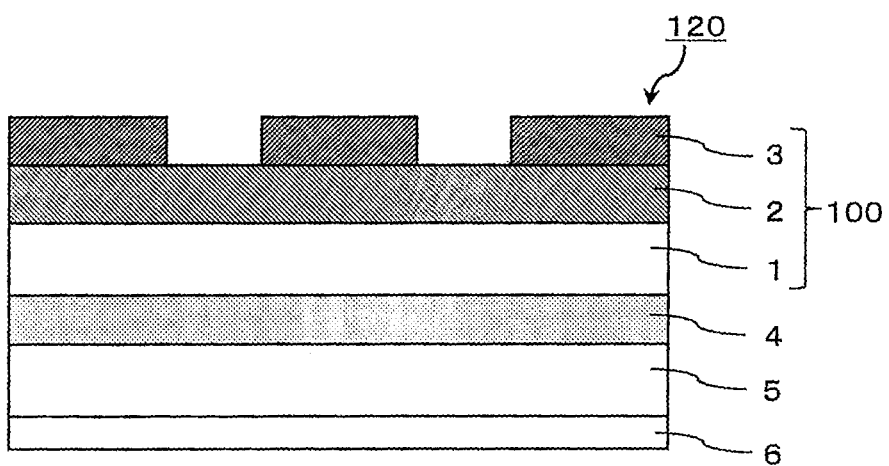
FIG. 12 is a schematic cross-sectional view showing a lamination configuration of a transparent conductive film.

A transparent substrate 5 may be bonded to one surface of the transparent conductive film via the transparent pressure-sensitive adhesive layer 4. FIG. 12 shows a transparent conductive film 120 in which the transparent substrate 5 is bonded to, via the transparent pressure-sensitive adhesive layer 4, the surface on the side of the transparent film substrate 1 where the transparent conductive layer 3 is not provided in the transparent conductive film 100 of FIG. 2. The transparent substrate 5 may comprise one substrate film or may be a laminate of two or more of the substrate films (for example, a laminate in which the substrate films are laminated via a transparent pressure-sensitive adhesive layer). As shown in FIG. 12, a hard coating layer (a resin layer) 6 can be provided on the outer surface of the transparent substrate 5. A configuration in which the transparent substrate is bonded to the transparent conductive film of FIG. 2 is exemplified in FIG. 12. However, a transparent conductive film having the configuration of FIGS. 1 and 3 can be applied in place of the configuration of FIG. 2. In the same manner, the transparent substrate 5 may be further bonded to the transparent conductive films having the structures of FIGS. 5 to 9 via the pressure-sensitive adhesive layer 4.

The thickness of the transparent substrate 5 is normally preferably 90 to 300 μm, and more preferably 100 to 250 μm. When the transparent substrate 5 is formed with a plurality of substrate films, the thickness of each substrate film is preferably 10 to 200 μm, and more preferably 20 to 150 μm. The total thickness as the transparent substrate 5 including the transparent pressure-sensitive adhesive layer in addition to these substrate films is preferably controlled to fall within the above-described range. The same materials as those of the transparent film substrate 1 described above can be suitably used for the substrate film.

The transparent conductive film and the transparent substrate 5 may be bonded together by providing the pressure-sensitive adhesive layer 4 on the transparent substrate 5 side and then bonding the transparent film substrate 1 of the transparent conductive film to the pressure-sensitive adhesive layer 4 or conversely, by providing the pressure-sensitive adhesive layer 4 on the film substrate 1 side of the transparent conductive film and then bonding the transparent substrate 5 to the pressure-sensitive adhesive layer 4. Because, according to the latter method, the pressure-sensitive adhesive layer 4 can be successively formed with the transparent film substrate 1 that is in a roll state, the latter method is more advantageous in view of productivity. The transparent conductive film 100 and the transparent substrate 5 can be laminated by sequentially bonding a plurality of substrate films on the transparent film substrate 1 via a pressure-sensitive adhesive layer. The same materials as those of the following transparent pressure-sensitive adhesive layer 4 can be used for the transparent pressure-sensitive adhesive layer used in lamination of the transparent substrate 5. Further, the transparent conductive films can be bonded together by appropriately selecting the lamination surface of the transparent conductive film on which the pressure-sensitive adhesive layer 4 is laminated.

Any transparent pressure-sensitive adhesive may be used for the pressure-sensitive adhesive layer 4 without limitation. For example, the pressure-sensitive adhesive may be appropriately selected from pressure-sensitive adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and exhibit suitable wettability and adhesion properties such as cohesiveness and adhesiveness, and are good in weather or heat resistance.

There is a type of pressure-sensitive adhesive that is capable of improving the anchoring force by using an appropriate undercoating agent for adhesion depending on a constituent material of the pressure-sensitive adhesive layer 4. Therefore, an undercoating agent for adhesion is preferably used when using such a pressure-sensitive adhesive.

A crosslinking agent appropriate to a base polymer can be added to the pressure-sensitive adhesive layer 4. Further, natural and synthetic resins, fillers including glass fibers, glass beads, metal powders, other inorganic powders and the like, and appropriate additives such as pigments, coloring agents, and antioxidants, for example, can be compounded in the pressure-sensitive adhesive layer 4 as necessary. A light diffusion property can be given to the pressure-sensitive adhesive layer 4 by adding transparent fine particles.

The pressure-sensitive adhesive layer 4 is generally used as a pressure-sensitive adhesive solution (with a solids content of about 10 to about 50% by weight) containing a base polymer or a composition thereof dissolved or dispersed in a solvent. The solvent to be used may be appropriately selected from an organic solvent such as toluene and ethyl acetate, and water and the like depending on the type of the pressure-sensitive adhesive.

After the bonding of the transparent substrate 5, for example, the transparent pressure-sensitive adhesive layer 4 has a cushion effect and thus can function to improve the scratch resistance of the transparent conductive layer 3 formed on one surface of the transparent film substrate or to improve the tap properties thereof for touch panels, such as so called pen input durability and surface pressure durability. Therefore, particularly in case that the pressure-sensitive adhesive layer is use for the resistive film type touch panel, a lamination configuration depicted in FIG. 12 is preferably employed. In terms of performing this cushion effect better, it is preferred that the elastic modulus of the pressure-sensitive adhesive layer 4 is set in the range of 1 to 100 N/cm$^2$ and that its thickness is set at 1 μm or more, generally in the range of 5 to 100 μm. If the thickness is in the above described range, the cushion effect can be sufficiently exerted, and the adhesion between the transparent substrate 5 and the transparent film substrate 1 can also be sufficient. If the thickness of the pressure-sensitive adhesive layer 4 is thinner than the above described range, the durability and the adhesion cannot be sufficiently secured. If the thickness is thicker than the above described range, problems with its appearance such as transparency may occur. Here, in other aspects, the respective preferable ranges of the elastic modulus and the thickness of the pressure-sensitive adhesive layer 4 to be applied to the transparent conductive film may be the same as those described above.

The transparent substrate 5 bonded through such pressure-sensitive adhesive layer 4 imparts good mechanical strength to the transparent film substrate 1 to contribute to the prevention of curling or the like in addition to improvement of the pen input durability or the surface pressure durability.

When the pressure-sensitive adhesive layer 4 is transferred using a separator 9, it is preferable to use, as such a separator, a polyester film or the like in which a migration-preventing layer and/or a release layer are laminated on at least adhesion surface of the polyester film to the pressure-sensitive adhesive layer 4.

The total thickness of the separator 9 is preferably 30 μm or more, more preferably from 60 to 100 μm. This is to prevent deformation of the pressure-sensitive adhesive layer 4 (dents) that would be expected to occur due to foreign substances or the like intruding between the rolled layers in a case that it is stored in the form of a roll after formation of the pressure-sensitive adhesive layer 4.

The migration-preventing layer may be made of an appropriate material for preventing migration of migrant components in the polyester film, particularly for preventing migration of low molecular weight oligomer components in the polyester. An inorganic or organic material or a composite of inorganic and organic materials may be used as a material for forming the migration-preventing layer. The thickness of the migration-preventing layer may be set in the range of 0.01 to 20 μm as needed. The migration-preventing layer may be formed by any method such as coating, spraying, spin coating, and in-line coating. Vacuum deposition, sputtering, ion plating, spray thermal decomposition, chemical plating, electroplating, or the like may also be used.

The release layer may be made of an appropriate release agent such as a silicone release agent, a long-chain alkyl release agent, a fluorochemical release agent, and a molybdenum sulfide release agent. The thickness of the release layer may be set as appropriate in view of the release effect. In general, the thickness is preferably 20 μm or less, more preferably in the range of 0.01 ton μm, particularly preferably in the range of 0.1 to 5 μm, in view of handleability such as flexibility. A production method of the release layer is not particularly limited, and the same manner as in the case of the migration-preventing layer can be adopted.

The hard coating layer (a resin layer) 6 may be provided on the outer surface (the surface opposite to the pressure-sensitive adhesive layer 4) of the transparent substrate 5 in order to protect the outer surface as necessary. A cured film made of a curable resin such as a melamine resin, a urethane resin, an alkyd resin, an acrylic resin, and a silicone resin can be preferably used as the hard coating layer 6 for example. The thickness of the hard coating layer 6 is preferably 0.1 to 30 μm. When the thickness is less than 0.1 μm, hardness may become insufficient. When the thickness exceeds 30 μm, cracks may be generated in the hard coating layer 6 or the entire transparent substrate 5 may be curled.

An antiglare treatment layer and an anti-reflection layer can be provided in the transparent conductive film of the present invention to improve its visibility. When the transparent conductive film is used in a resistive film type touch panel, an antiglare treatment layer and an anti-reflection layer can be provided on the outer surface (surface opposite to the pressure-sensitive adhesive layer 4) of the transparent substrate 5 in the same way as the hard coating layer 6. Further, an antiglare treatment layer and an anti-reflection layer can be provided on the hard coating layer 6. On the other hand, when the transparent conductive film is used in a capacitive type touch panel, an antiglare treatment layer and an anti-reflection layer may be provided on the transparent conductive layer 3.

The transparent conductive film of the present invention can be suitably applied to touch panels of an optical type, an ultrasonic type, a capacitive type, and a resistive film type for example. Especially, even when the transparent conductive layer is patterned, the difference in visibility, especially the difference in the reflectance, between the pattern portion and the pattern opening portion can be kept small. Therefore, the transparent conductive film is suitably used in a touch panel having the transparent conductive layer that is patterned to a prescribed shape, such as a projection capacitive type touch panel or a resistive film type touch panel that is capable of multi-point input.

EXAMPLES

The present invention is explained below in detail with reference to examples. However, the present invention is not limited to the following examples as long as there is no deviation from the gist of the invention.

<Refractive Index>

The refractive index of each layer was measured with an Abbe refractometer manufactured by Atago Co., Ltd. according to the measurement method specified for the refractometer, while a measurement light beam (Sodium D line) was applied to the surface of each object to be measured.

<Thickness of Each Layer>

Regarding layers having a thickness of 1 μm or more such as the film substrate, the transparent substrate, the hard coating layer, and the pressure-sensitive adhesive layer, measurement was performed with a micro gauge type thickness gauge manufactured by Mitutoyo Corporation. The thickness of layers such as the hard coating layer and the pressure-sensitive adhesive layer, of which thickness is difficult to directly measure, was obtained by measuring the total thickness of the substrate in which each layer was provided and then subtracting the thickness of the substrate from the total thickness.

The thickness of the first dielectric layer, the second dielectric layer, an ITO film, and the like was calculated based on the waveform of interference spectrum using an instant multi-photometry system "MCPD2000" (trade name) manufactured by Otsuka Electronics Co., Ltd.

<Reflection Characteristics>

Each reflectance at the pattern portion and a region directly under the pattern opening portion was measured in a region where the wavelength was 380 to 780 nm at intervals of 5 nm with an incident angle into the ITO film of 2° using a spectrophotometer "U-4100" (trade name) in an integrating sphere measurement mode, manufactured by Hitachi High Technologies Corporation. Then, each average reflectance at the pattern portion and the region directly under the pattern opening portion was calculated, and the difference $\Delta R$ in reflectance between the pattern portion and the region directly under the pattern opening portion was calculated from these average reflectance values. The measurement was performed under a condition in which there is little reflection from the backside of the sample and little incident light from the backside by forming a shielding layer using a black spray on the backside (a PET film side) of the transparent conductive film (sample). $L^*$, $a^*$, and $b^*$ of each reflected light at the pattern portion and the region directly under the pattern opening portion were calculated using a D65 light source, and the color difference $\Delta E$ between the reflected light at the pattern portion and the reflected light at the region directly under the pattern opening portion was calculated using the following formula.

$$\Delta E = \{(\Delta L^*)^2 + ((\Delta a^*)^2 + (\Delta b^*)^2\}^{0.5}$$

Example 1

(Formation of Dielectric Layer)

A first dielectric layer having a thickness $d_{21}$ of 20 nm was formed by applying a thermosetting resin composition in which a weight ratio of melamine resin:alkyd resin:organic silane condensate is 2:2:1 onto one surface of a transparent film substrate (refractive index $n_1$=1.65) consisting of a polyethylene terephthalate film (referred to as a PET film hereinafter) having a thickness of 25 μm, and drying and curing the composition. The refractive index $n_1$ of the first dielectric layer was 1.54.

Then, a second dielectric layer having a thickness $d_{22}$ of 10 nm was formed by diluting silica sol (Colcoat P manufactured by Colcoat Co., Ltd.) with ethanol so that the solid content became 2% by weight, applying the diluted sol to the first dielectric layer by a silica coating method, and drying and curing the sol. The refractive index $n_{22}$ of the second dielectric layer was 1.46.

(Formation of Ito Film)

A transparent conductive film was obtained by forming an ITO film (refractive index $n_3$=2.00) having a thickness of 23 nm on the second dielectric layer by a reactive sputtering method using a sintered material of 97% by weight of indium oxide and 3% by weight of tin oxide in an atmosphere of 0.4 Pa consisting of 98% of argon gas and 2% of oxygen gas.

(Patterning of Ito Film)

A photoresist patterned in stripes was applied to the transparent conductive layer of the transparent conductive film, and was dried and cured. Then, etching of the ITO film was performed by immersing the transparent conductive film in 5% by weight of hydrochloric acid (an aqueous hydrogen chloride solution) at 25° C. for 1 minute. After that, the photoresist was removed.

(Crystallization of Ito Film)

The ITO film was crystallized by performing a heating treatment at 140° C. for 90 minutes after etching of the ITO film.

Example 2

A transparent conductive film was obtained by forming the first dielectric layer, the second dielectric layer, and the ITO film on one surface of the PET film in the same manner as in Example 1.

(Patterning of Ito Film)

A photoresist patterned in stripes was applied to the transparent conductive layer of the transparent conductive film, and was dried and cured. Then, etching of the ITO film was performed by immersing the transparent conductive film in 5% by weight of hydrochloric acid at 25° C. for 1 minute.

(Patterning of Second Dielectric Layer)

After the ITO film was etched, etching of the second dielectric layer was performed by immersing the transparent conductive film in 2% by weight of an aqueous sodium hydroxide solution at 45° C. for 3 minutes with the photoresist being still laminated. After that, the photoresist was removed.

(Crystallization of Ito Film)

The ITO film was crystallized by performing a heating treatment at 140° C. for 90 minutes after the ITO film and the second dielectric layer were patterned.

Examples 3 and 4

In Examples 3 and 4, each transparent conductive film having a pattern portion and a pattern opening portion was produced in the same manner as in Examples 1 and 2. However, Examples 3 and 4 were different from Examples 1 and 2 in respect that the thickness $d_{21}$ of the first dielectric layer was 35 nm and the thickness $d_{22}$ of the second dielectric layer was 5 nm.

Examples 5 and 6

In Examples 5 and 6, each transparent conductive film having a pattern portion and a pattern opening portion was produced in the same manner as in Examples 1 and 2. However, Examples 5 and 6 were different from Examples 1 and 2 in respect that the thickness $d_{21}$ of the first dielectric layer was 30 nm and the thickness $d_{22}$ of the second dielectric layer was 15 nm.

Comparative Example 1

In Comparative Example 1, a transparent conductive film having a pattern portion and a pattern opening portion was produced in the same manner as in Example 1. However, Comparative Example 1 was different from Example 1 in respect that the thickness $d_{21}$ of the first dielectric layer was 45 nm and the thickness $d_{22}$ of the second dielectric layer was 10 nm.

Comparative Example 2

In Comparative Example 2, a transparent conductive film having a pattern portion and a pattern opening portion was produced in the same manner as in Example 1. However, Comparative Example 2 was different from Example 1 in respect that the thickness $d_{21}$ of the first dielectric layer was 30 nm and the thickness $d_{22}$ of the second dielectric layer was 30 nm.

Comparative Example 3

In Comparative Example 3, a transparent conductive film having a pattern portion and a pattern opening portion was produced in the same manner as in Example 1. However, Comparative Example 3 was different from Example 1 in respect that the thickness $d_{21}$ of the first dielectric layer was 40 nm and the thickness $d_{22}$ of the second dielectric layer was 30 nm.

Comparative Example 4

In Comparative Example 4, a transparent conductive film having a pattern portion and a pattern opening portion was produced in the same manner as in Example 1. However, Comparative Example 4 was different from Example 1 in respect that the first dielectric layer was formed in the following manner and the thickness $d_{22}$ of the second dielectric layer was 35 nm.

(Formation of First Dielectric Layer)

A silicon tin oxide film having a thickness of 20 nm as the first dielectric layer was formed on one surface of a PET film substrate (refractive index $n_1$=1.65) having a thickness of 25 μm by a sputtering method. The refractive index of the first dielectric layer was 1.70.

The evaluation results of the transparent conductive films of the respective examples and comparative examples are shown in Table 1.

TABLE 1

| | First Dielectric Layer | | Second Dielectric Layer | | | $d_{21} - d_{22}$ (nm) | Reflection Characteristics | |
|---|---|---|---|---|---|---|---|---|
| | $n_{21}$ | $d_{21}$ (nm) | $n_{22}$ | $d_{22}$ (nm) | Patterning | | ΔE | ΔR (%) |
| Example 1 | 1.54 | 20 | 1.46 | 10 | No | 10 | 3.2 | 0.26 |
| Example 2 | 1.54 | 20 | 1.46 | 10 | Yes | 10 | 2.4 | 0.19 |
| Example 3 | 1.54 | 35 | 1.46 | 5 | No | 30 | 5.4 | 0.65 |
| Example 4 | 1.54 | 35 | 1.46 | 5 | Yes | 30 | 5.2 | 0.46 |
| Example 5 | 1.54 | 30 | 1.46 | 15 | No | 15 | 6.5 | 0.56 |
| Example 6 | 1.54 | 30 | 1.46 | 15 | Yes | 15 | 5.4 | 0.47 |
| Comparative Example 1 | 1.54 | 45 | 1.46 | 10 | No | 35 | 8.9 | 1.23 |
| Comparative Example 2 | 1.54 | 30 | 1.46 | 30 | No | 0 | 11.3 | 1.19 |
| Comparative Example 3 | 1.54 | 40 | 1.46 | 30 | No | 10 | 12.7 | 1.94 |
| Comparative Example 4 | 1.70 | 20 | 1.46 | 35 | No | — | 6.8 | 1.08 |

From Table 1, it can be understood that the difference in reflectance and the color difference between the pattern portion and the pattern opening portion in the transparent conductive film of the present invention are small even when the transparent conductive layer is patterned. Therefore, it can be seen that it is difficult to visually recognize the pattern. Especially when the second dielectric layer is patterned similarly to the transparent conductive layer as shown in Examples 2, 4, and 6, it is more difficult to visually recognize the pattern and therefore the appearance is good.

What is claimed is:

1. A transparent conductive film, comprising a first dielectric layer, a second dielectric layer, and a transparent conductive layer in this order on a transparent film substrate, wherein
    at least the transparent conductive layer is patterned, and the film has a pattern opening portion that does not have the transparent conductive layer and a pattern portion that has the transparent conductive layer,
    a thickness $d_{21}$ of the first dielectric layer is larger than a thickness $d_{22}$ of the second dielectric layer,
    the thickness $d_{21}$ of the first dielectric layer is 8 to 40 nm and the thickness $d_{22}$ of the second dielectric layer is 3 to 25 nm,
    a difference between the thickness $d_{21}$ of the first dielectric layer and the thickness $d_{22}$ of the second dielectric layer, $d_{21}-d_{22}$, is 3 to 30 nm, and
    a refractive index $n_{21}$ of the first dielectric layer and a refractive index $n_3$ of the transparent conductive layer satisfy the relationship $n_{21}<n_3$, and
    a total of optical thickness of the first dielectric layer, the second dielectric layer, and the transparent conductive layer is 45 to 155 nm
    wherein a refractive index $n_1$ of the transparent film substrate, a refractive index $n_{21}$ of the first dielectric layer, and a refractive index $n_3$ of the transparent conductive layer satisfy the relationship $n_{21}<n_1<n_3$.

2. The transparent conductive film according to claim 1, wherein the second dielectric layer is patterned similarly to the transparent conductive layer.

3. The transparent conductive film according to claim 1, wherein a difference ΔR in reflectance between reflected light when irradiating the pattern portion with white light and reflected light when irradiating a region directly under the pattern opening portion with white light is 1% or less, and a color difference ΔE is 6.7 or less.

4. The transparent conductive film according to claim 1, wherein a refractive index of the first dielectric layer is larger than a refractive index of the second dielectric layer.

5. The transparent conductive film according to claim 1, wherein the first dielectric layer is formed by wet coating.

6. The transparent conductive film according to claim 1, wherein the second dielectric layer is formed by wet coating.

7. The transparent conductive film according to claim 1, wherein a refractive index $n_1$ of the transparent film substrate, a refractive index $n_{21}$ of the first dielectric layer, a refractive index $n_{22}$ of the second dielectric layer, and a refractive index $n_3$ of the transparent conductive layer satisfy the relationship $n_{22}<n_{21}<n_1<n_3$.

8. The transparent conductive film according to claim 1, wherein a difference $n_3-n_{22}$ between the refractive index $n_3$ of the transparent conductive layer and the refractive index $n_{22}$ of the second dielectric layer is 0.1 or more.

9. The transparent conductive film according to claim 1, wherein the refractive index $n_{21}$ of the first dielectric layer is 1.5 to 1.7, and the refractive index $n_{22}$ of the second dielectric layer is 1.4 to 1.5.

10. The transparent conductive film according to claim 1, wherein a difference between a total of the optical thickness of the pattern portion and a total of the optical thickness of the pattern opening portion is 35 to 90 nm.

11. A transparent conductive film, wherein at least two of the transparent conductive films according to claim 1 are laminated via a transparent pressure-sensitive adhesive layer so that the transparent conductive layer is arranged on at least one surface of the resulting transparent conductive film.

12. A transparent conductive film, wherein a transparent substrate is bonded to one surface of the transparent conductive film according to claim 1 via a transparent pressure-sensitive adhesive layer so that the transparent conductive layer is arranged on one surface of the resulting transparent conductive film.

13. A touch panel comprising the transparent conductive film according to claim 1.

14. The touch panel according to claim 13, that is of a projection capacitive type or a matrix resistive film type.

* * * * *